(12) United States Patent
Kang et al.

(10) Patent No.: US 9,503,291 B1
(45) Date of Patent: Nov. 22, 2016

(54) METHOD AND APPARATUS FOR DISCRETE MULTITONE TRANSMISSION

(71) Applicants: GLOBAL UNICHIP CORPORATION, Hsinchu (TW); TAIWAN SEMICONDUCTOR MANUFACTURING CO., LTD., Hsinchu (TW)

(72) Inventors: Wen-Juh Kang, Tainan (TW); Yu-Chu Chen, Hsinchu (TW)

(73) Assignees: GLOBAL UNICHIP CORPORATION, Hsinchu (TW); TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 14/932,937

(22) Filed: Nov. 4, 2015

(51) Int. Cl.
*H03H 7/30* (2006.01)
*H04L 25/03* (2006.01)
*H04B 1/12* (2006.01)

(52) U.S. Cl.
CPC ......... *H04L 25/03019* (2013.01); *H04B 1/123* (2013.01)

(58) Field of Classification Search
CPC .............. H04L 27/01; H04L 27/2647; H04L 25/03044; H04L 25/0242; H04L 25/03038; H04L 25/03057
USPC ........................................ 375/232, 229, 230
See application file for complete search history.

(56) References Cited

U.S. PATENT DOCUMENTS

| | | | |
|---|---|---|---|
| 6,320,901 B1 | 11/2001 | Arad et al. | |
| 6,526,105 B1* | 2/2003 | Harikumar | H04L 25/03012 375/232 |
| 6,535,552 B1* | 3/2003 | Pessoa | H04L 25/03159 370/292 |
| 6,735,244 B1* | 5/2004 | Hasegawa | H04L 25/03038 375/219 |
| 6,829,296 B1* | 12/2004 | Troulis | H04L 25/03038 375/229 |
| 7,177,378 B2 | 2/2007 | Baldemair et al. | |
| 2003/0043894 A1* | 3/2003 | Sestok, IV | H04L 25/03038 375/219 |
| 2003/0112861 A1* | 6/2003 | Erdogan | H04L 25/03038 375/232 |
| 2006/0153310 A1 | 7/2006 | Tung | |
| 2007/0265725 A1* | 11/2007 | Liu | G06F 17/50 700/121 |
| 2008/0266413 A1* | 10/2008 | Cohen | G06T 5/20 348/222.1 |
| 2011/0255586 A1* | 10/2011 | Li | H04L 25/03044 375/231 |
| 2011/0293053 A1 | 12/2011 | Harikumar et al. | |
| 2012/0155530 A1 | 6/2012 | Zhong | |
| 2013/0208788 A1 | 8/2013 | Chen et al. | |
| 2014/0258951 A1 | 9/2014 | Danti et al. | |
| 2015/0032788 A1* | 1/2015 | Velazquez | H04L 27/265 708/819 |

OTHER PUBLICATIONS

Richard K. Martin et al., "Infinite Length Results and Design Implications for Time-Domain Equalizers" IEEE Transactions on Signal Processing, vol. 52, Issue. 1, pp. 297-301, Fall 2003.

* cited by examiner

*Primary Examiner* — Helene Tayong
(74) *Attorney, Agent, or Firm* — CKC & Partners Co., Ltd.

(57) ABSTRACT

A method for discrete multitone (DMT) transmission is disclosed. In the method, a DMT signal is received from a transmission channel. The DMT signal is passed through a time-domain equalizer (TEQ) to obtain an equalized DMT signal. The DMT signal is passed through a target impulse response (TIR) filter to obtain a TIR signal. A mean square error (MSE) of an error signal is obtained from the equalized DMT signal and the TIR signal. A TEQ coefficient vector of the TEQ is iteratively updated based on the MSE of the error signal, a frequency kernel matrix corresponding to the TEQ and a frequency kernel matrix corresponding to the TIR filter.

18 Claims, 5 Drawing Sheets

METHOD AND APPARATUS FOR DISCRETE MULTITONE TRANSMISSION

BACKGROUND

Field of the Invention

The present invention relates to a transmission system, and more particularly to a method and apparatus of a discrete multitone (DMT) transmission system.

Description of Related Art

DMT modulation is a form of multicarrier modulation that divides the available bandwidth into several independent subchannels. The DMT modulation is able to adapt bit and power allocation of each subchannel, such that the throughput of each subchannel is maximized. Among the subchannels, if a subchannel is unable to be used for transmission due to serious interference from external environment, the subchannel can be turned off, while the other subchannels are not affected, such that the available bandwidth is optimized. With at least these advantages, DMT transmission is extensively used in broadband wireline communication systems, such as asymmetric digital subscriber line (ADSL) and very-high speed digital subscriber line (VDSL) systems. The DMT transmission is also proposed as a potential solution in the next generation serializer-deserializer (SERDES) system with a signal throughput up to 56 Gbps or 112 Gbps.

SUMMARY

The objective of the present invention is to provide a method and apparatus for DMT transmission. By utilizing the method and apparatus of the present invention for a DMT transmission system, both of the time-domain response and the frequency-domain response of the time-domain equalizer (TEQ) in the null band can be effectively suppressed, thereby improving the DMT transmission quality.

One aspect of the present invention is to provide a method for discrete multitone (DMT) transmission. In this method, a DMT signal is received from a transmission channel. The received DMT signal is passed through the TEQ to obtain an equalized DMT signal. The DMT signal is passed through a target impulse response (TIR) filter to obtain a TIR signal. A mean square error (MSE) of an error signal is obtained from the equalized DMT signal and the TIR signal. A TEQ coefficient vector of the TEQ is iteratively updated based on the MSE of the error signal, a frequency kernel matrix corresponding to the TEQ and a frequency kernel matrix corresponding to the TIR filter.

Another aspect of the present invention is to provide an apparatus for DMT transmission. The apparatus includes a TEQ, a TIR filter, an adder and a processor. The TEQ is configured to pass a received DMT signal therethrough to obtain an equalized DMT signal. The TIR filter is configured to pass the DMT signal therethrough to obtain a TIR signal. The adder is configured to generate an error signal from the equalized DMT signal and the TIR signal. The processor is configured to perform operations including obtaining a MSE of an error signal from the equalized DMT signal and the TIR signal and iteratively updating a TEQ coefficient vector of the TEQ based on the MSE of the error signal, a frequency kernel matrix corresponding to the TEQ and a frequency kernel matrix corresponding to the TIR filter.

BRIEF DESCRIPTION OF THE DRAWINGS

The present invention can be more fully understood by reading the following detailed description of the embodiment, with reference made to the accompanying drawings as follows.

DETAILED DESCRIPTION

Reference will now be made in detail to the embodiments of the present invention, examples of which are illustrated in the accompanying drawings. Wherever possible, the same reference numbers are used in the drawings and the description to refer to the same or like parts.

Figure 1:
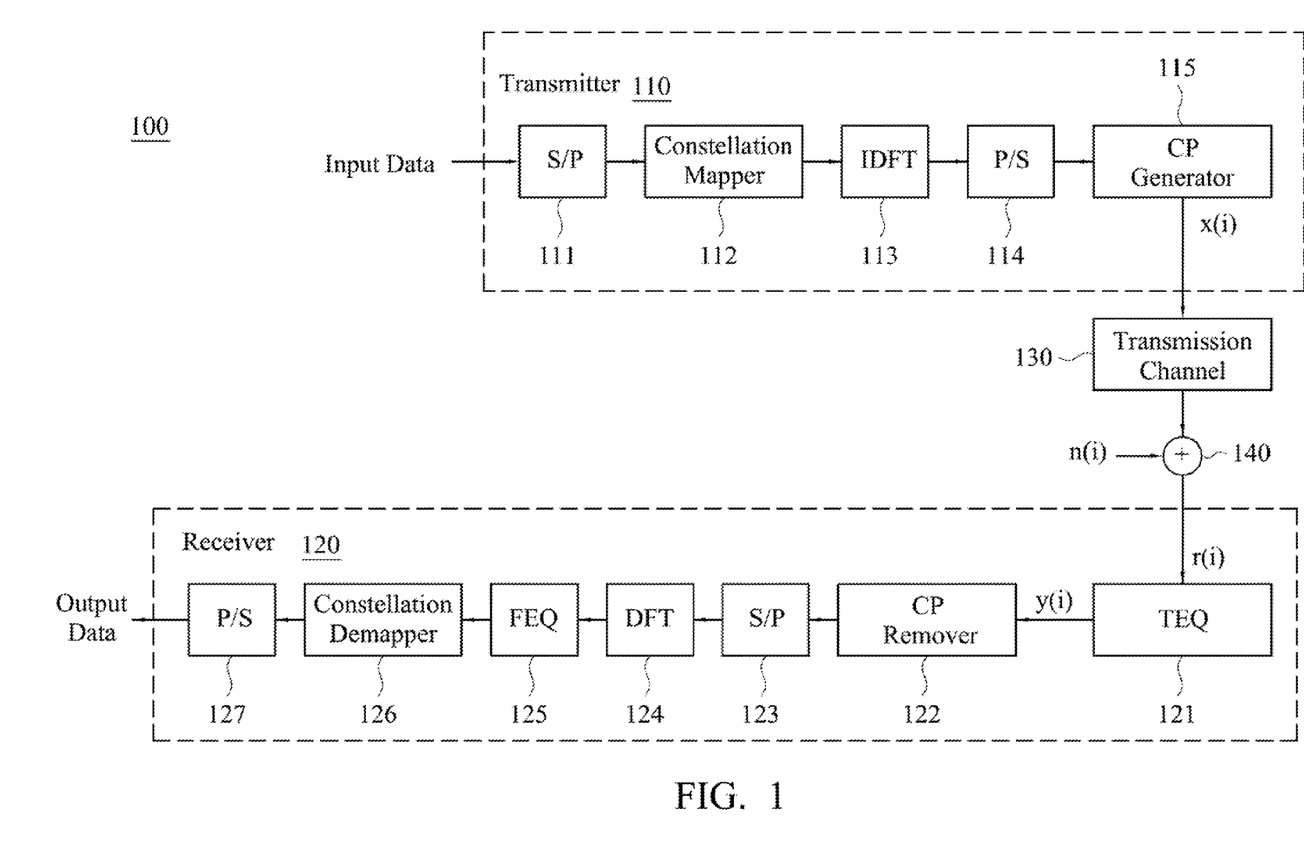
FIG. 1 illustrates a block diagram of a DMT transmission system in accordance with some embodiments of the present invention.

FIG. 1 illustrates a block diagram of a discrete multitone (DMT) transmission system 100 in accordance with some embodiments of the present invention. The DMT transmission system 100 implements DMT data transmission technology, and has been standardized for various types of digital subscriber lines (DSLs) transmission, such as asymmetric digital subscriber lines (ADSLs) transmission, very-high-bit-rate digital subscriber lines (VDSLs) transmission.

As shown in FIG. 1, the DMT transmission system 100 includes a transmitter 110, a receiver 120 and a transmission channel 130 between the transmitter 110 and the receiver 120. The transmitter 110 converts input binary data into DMT signal, and the DMT signal is transmitted to the receiver 120 through the transmission channel 130.

The transmitter 110 includes a serial-to-parallel (S/P) converter 111, a constellation mapper 112, an inverse digital Fourier transformer (IDFT) 113, a parallel-to-serial (P/S) converter 114 and a cyclic prefix (CP) generator 115. The S/P converter 111 demultiplexes the input binary data from serial form into parallel form. The constellation mapper 112 maps the input binary data into a complex number for each subchannel. The IDFT 113 transforms the mapped complex numbers of all suubchannels from frequency-domain into time-domain. The IDFT 113 may use an inverse Fast Fourier Transform (IFFT) algorithm to implement the frequency-domain to time-domain transformation. The P/S converter 114 converts the parallel time-domain input data into serial time-domain output samples, and the serial time-domain output samples comprise DMT symbols. The CP generator 115 inserts cyclic prefixes into the serial time-domain output samples to form the DMT signal. The transmitter 110 further includes a digital-to-analog (D/A) converter (not shown) for converting the DMT signal into analog form labeled as x(i).

The DMT signal x(i) is transmitted to the receiver 120 through the transmission channel 130 with a channel impulse response h(i) and the adder 140 where an additive noise n(i) is added thereto. The relationship between the received DMT signal r(i), the DMT signal x(i), the channel impulse response h(i) and the additive noise n(i) is r(i)=x(i)*h(i)+n(i), where * denotes a convolution operation.

The receiver 120 includes a time-domain equalizer (TEQ) 121, a CP remover 122, a S/P converter 123, a digital Fourier transformer (DFT) 124, a frequency equalizer (FEQ) 125, a constellation demapper 126 and a P/S converter 127. The TEQ 121 equalizes the received DMT signal r(i) to obtain an equalized DMT signal y(i). In addition, the receiver 120 further includes an analog-to-digital (A/D) converter (not shown) for converting the received DMT signal y(i) into analog form before transmitting the received DMT signal y(i) to the TEQ 121. The CP remover 122 removes the cyclic prefixes from the received DMT signal to generate time-domain serial data. The S/P converter 123 converts the time-domain serial data into time-domain parallel data. The DFT 124 transforms the time-domain parallel data into frequency-domain. The DFT 124 may use a Fast Fourier Transform (FFT) algorithm to implement the time-domain to frequency-domain transformation. The FEQ 125 performs single-tap equalization per subcarrier on the frequency-domain parallel data. The constellation demapper 126 performs demapping corresponding to the constellation mapping of the constellation mapper 112 to the equalized frequency-domain parallel data outputted by the FEQ 125 to generate parallel output binary data, which is the estimation of the input binary data in the multibit subchannels. The P/S converter 127 multiplexes the parallel output binary data into serial form.

However, for the DMT transmission system 100, if the memory order of the channel impulse response h(i) is greater than the length of the cyclic prefixes, undesirable disturbances, such as inter-symbol interference (ISI) and inter-carrier interference (ICI), will be produced, resulting in degradation of signal transmission.

Figure 2:
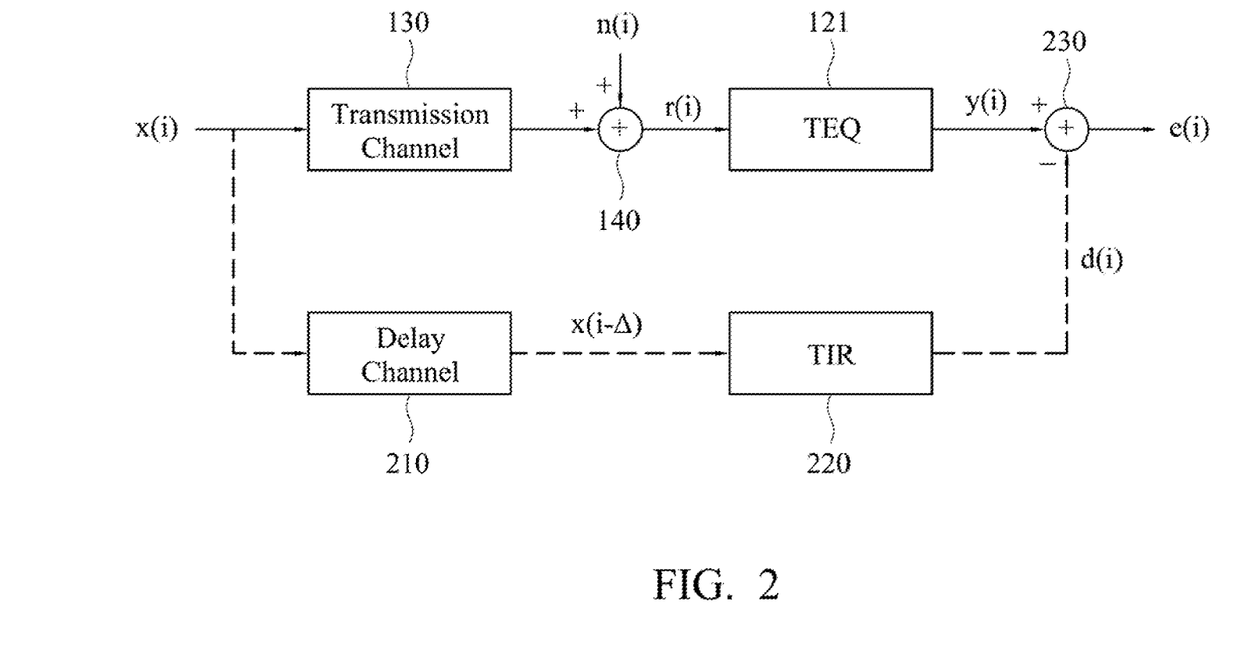
FIG. 2 illustrates a minimum mean square error (MMSE) system model used for the DMT transmission system of FIG. 1 for determining TEQ filter coefficients in accordance with some embodiments of the present invention.

To avoid the ISI and ICI, TEQ filter coefficients of the TEQ 121 are determined to shorten the effective length of the transmission channel 130. FIG. 2 illustrates a minimum mean square error (MMSE) system model used for the DMT transmission system 100 of FIG. 1 for determining the TEQ filter coefficients in accordance with some embodiments of the present invention. As shown in FIG. 2, the MMSE system model provides two branches; the first branch includes the transmission channel 130 and the TEQ 121, and the second branch is a hypothetical parallel branch, which includes a delay channel 210 and a target impulse response (TIR) filter 220. The first branch is the same as the transmission path shown in FIG. 1, and thus the detailed description thereof is not repeated.

In the second branch, the delay channel 210 provides a delay function to the DMT signal x(i) with a delay Δ via the transmission channel 130 and the TEQ 121, and the TIR filter 220 filters the delayed DMT signal x(k−Δ) with virtual TIR coefficients to obtain a TIR signal d(i).

The adder 230 generates and outputs an error signal e(i) by subtracting the TIR signal d(i) from the input signal equalized DMT signal y(i). The power of the error signal e(i) is minimized by shortening the channel impulse response via determining optimum TEQ coefficients for the TEQ 121. The optimum TEQ coefficients for minimizing the error signal e(i) can be obtained from minimizing a cost function, which is expressed as Equation (1):

$$E\{e^2\}=E\{w^T y - b^T x\}, \tag{1}$$

where $E\{e^2\}$ is the MSE (mean square error) of the error signal e(i), w is a TEQ coefficient vector of the TEQ 121, y is a sample vector of the equalized DMT signal y(i), x is a sample vector of the transmitted DMT signal x(i), b is a TIR coefficient vector of the TIR filter 220, and $\cdot^T$ is a transpose notation.

To obtain an optimum TEQ coefficient vector $w_{opt}$, let the partial derivative of the MSE $E\{e^2\}$ of the DMT transmission system 100 with respect to the TEQ coefficient vector w equals 0, and the optimum TEQ coefficient vector $w_{opt}$ can be obtained as:

$$w_{opt}=R_{yy}^{-1}R_{yx}b, \tag{2}$$

where $R_{yy}$ is an autocorrelation matrix of the sample vector y of the equalized DMT signal y(i), and $R_{yx}$ is a cross-correlation matrix between the sample vector y and a sample vector x of the transmitted DMT signal x(i).

Figure 3:
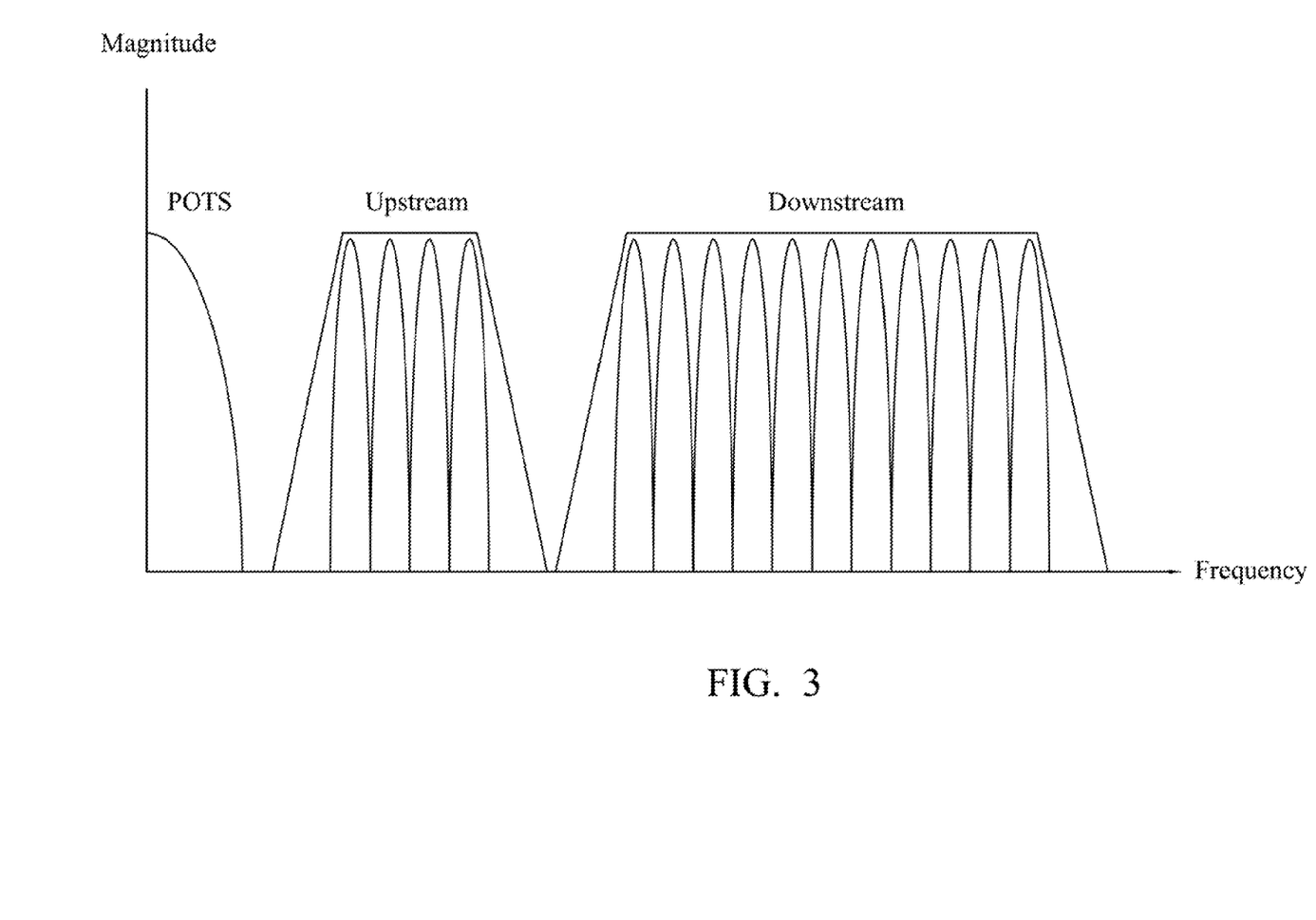
FIG. 3 illustrates a frequency spectrum for a DMT-based transmission system.

FIG. 3 illustrates a frequency spectrum for a DMT-based transmission system, which may be an ADSL system, a VDSL system, a high-speed SERDES system, or the like. In FIG. 3, a plain old telephone service (POTS) frequency band, an upstream band and a downstream band are illustrated. The POTS upstream band is usually in the range of 0 to 4 KHz. The upstream band and the downstream band may be, for example, an ADSL upstream band and an ADSL downstream band, but are not limited thereto. In an ADSL system case, the upstream frequency band is in the range of 25.875 KHz to 138 KHz, the download frequency band is in the range of 138 KHz to 1.1 MHz. Further, a guard band exists between the POTS and ADSL frequency bands.

The overall ADSL frequency band consists of 255 frequency subcarriers (bins) each having a frequency band of 4.3125 KHz. Among the 255 frequency subcarriers, 224 frequency subcarriers are in the ADSL downstream band, and the other 31 frequency subcarriers are in the ADSL upstream band. In some embodiments, some of the frequency subcarriers near the boundary between the ADSL upstream band and the ADSL downstream band are used as a guardband.

Figure 4:
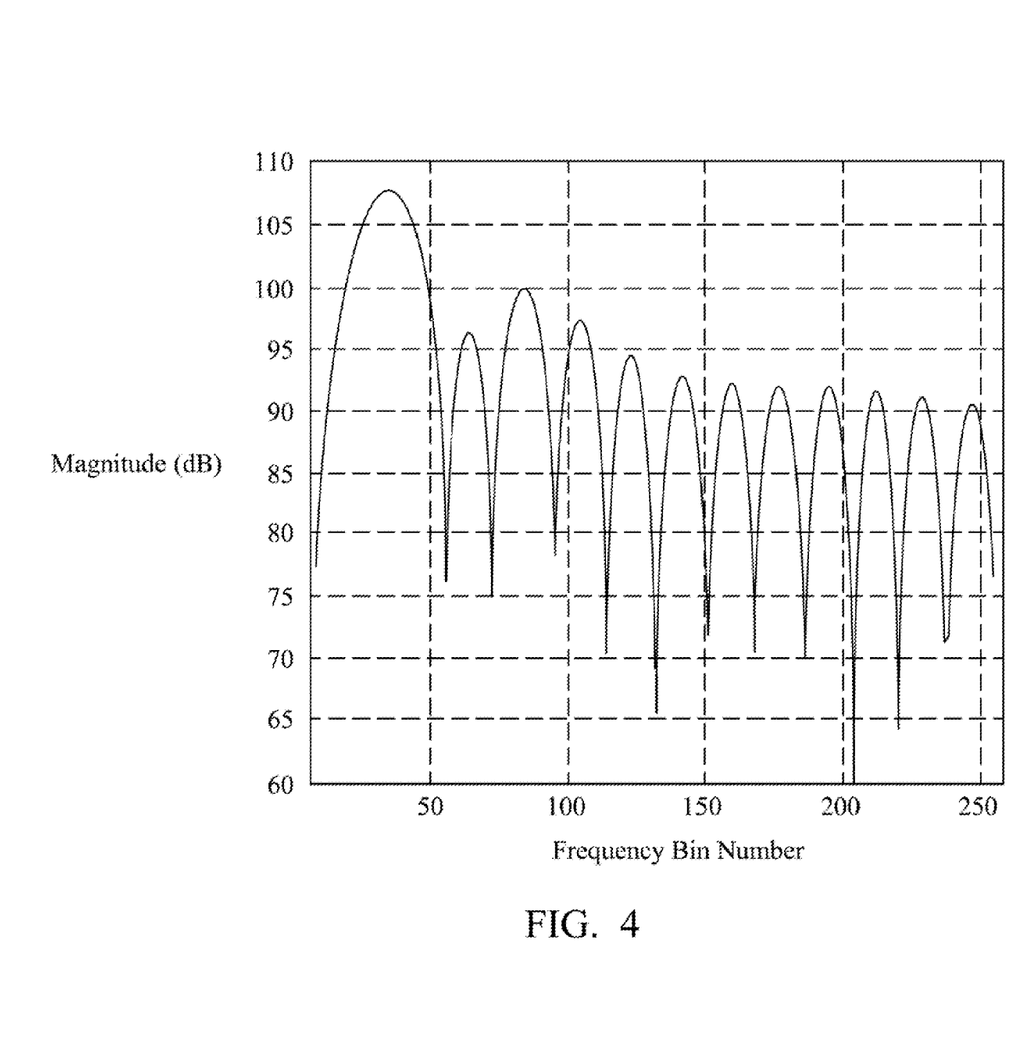
FIG. 4 shows a frequency-domain response of the TEQ in FIG. 1 with the TEQ coefficients calculated by iteratively updating an optimum TEQ coefficient vector obtained from a cost function.

FIG. 4 shows a frequency-domain response of the TEQ 121 with the TEQ coefficients calculated by iteratively updating the optimum TEQ coefficient vector $w_{opt}$ obtained from Equation (2), where in particular, the ADSL transmission technology is adopted for illustration. As shown in FIG. 4, for downstream signals with the subcarriers in the upstream band (null frequency band) are masked by zeros, the optimized TEQ coefficients tend to amplify the magnitude of the upstream band (frequency bin number<32). A component of the noise n(i) in the upstream band is amplified, and thus the DMT transmission quality is affected.

To avoid boosting the null frequency band, the present invention provides a modified cost function to obtain optimum TEQ coefficients and TIR coefficients. Specifically, the modified cost function $E_{all}$ is expressed as Equation (3):

$$E_{all}=E\{e^2\}+E_s, \tag{3}$$

where $E\{e^2\}$ is the MSE of the error signal e(i) obtained from Equation (1), and $E_s$ is expressed as Equation (4):

$$E_s=w\Omega_w w^T + b\Omega_b b^T, \tag{4}$$

where w is the TEQ coefficient vector of the TEQ 121, $\Omega_w$ is a frequency kernel matrix corresponding to the TEQ 121, b is the TIR coefficient vector of the TIR filter 220, and $\Omega_b$ is a frequency kernel matrix corresponding to the TIR filter 220.

In some embodiments, the frequency kernel matrix $\Omega_w$ is determined from Equation (5):

$$\Omega_w = w_l \Omega_{wl} + w_h \Omega_{wh}, \quad (5)$$

where $\Omega_{wl}$ is a low-frequency kernel matrix of the TEQ 121, $\Omega_{wh}$ is a high-frequency kernel matrix of the TEQ 121, and $w_l$ and $w_h$ are weighting factors of the low-frequency kernel matrix $\Omega_{wl}$ and the high-frequency kernel matrix $\Omega_{wh}$, respectively. Similarly, in some embodiments, the frequency kernel matrix $\Omega_b$ is determined from Equation (6):

$$\Omega_b = w_l \Omega_{bl} + w_h \Omega_{bh}, \quad (6)$$

where $\Omega_{bl}$ is a low-frequency kernel matrix of the TIR filter 220, $\Omega_{bh}$ is a high-frequency kernel matrix of the TIR filter 220, and $w_l$ and $w_h$ are weighting factors of the low-frequency kernel matrix $\Omega_{bl}$ and the high-frequency kernel matrix $\Omega_{bh}$, respectively. For Equations (5) and (6), if the low-frequency and high-frequency bands are determined in advance, the frequency kernel matrix $\Omega_w$ and the frequency kernel matrix $\Omega_b$ can then be obtained.

In some embodiments, the frequency kernel matrix $\Omega_w$ may be obtained by performing an integration operation on a continuous frequency kernel matrix variable $\Omega_w(\omega)$ with respect to a frequency range of a stopband of the TEQ 121. For example, for 2× oversampling upstream signals at the receiver 120 and the TEQ 121 with a normalized frequency range of a stopband from $\pi/2$ to $\pi$, the continuous frequency kernel matrix variable $\Omega_w(\omega)$ is:

$$\begin{bmatrix} 1 & \cos(\omega) & \cos(2\omega) & \ldots & \cos[(N_w-1)\omega] \\ \cos(\omega) & 1 & \cos(\omega) & \ldots & \cos[(N_w-2)\omega] \\ \cos(2\omega) & \cos(\omega) & 1 & \ldots & \cos[(N_w-3)\omega] \\ \vdots & \vdots & \vdots & \ddots & \vdots \\ \cos[(N_w-1)\omega] & \cos[(N_w-2)\omega] & \cos[(N_w-3)\omega] & \ldots & 1 \end{bmatrix},$$

where $N_w$ is a TEQ length of the TEQ 121, and $\omega$ is the normalized frequency. The frequency kernel matrix $\Omega_w$ is then obtained from Equation (7):

$$\Omega_w = \int_{2/\pi}^{\pi} \Omega_w(\omega) d\omega \quad (7)$$

$$= \begin{bmatrix} \pi/2 & -1 & 0 & \ldots & \frac{(-1)^{(N_w/2)-1}}{N_w-1} \\ -1 & \pi/2 & -1 & \ldots & 0 \\ 0 & -1 & \pi/2 & \ldots & \frac{(-1)^{(N_w/2)-3}}{N_w-3} \\ \vdots & \vdots & \vdots & \ddots & \vdots \\ \frac{(-1)^{(N_w/2)-1}}{N_w-1} & 0 & \frac{(-1)^{(N_w/2)-3}}{N_w-3} & \ldots & \pi/2 \end{bmatrix}.$$

Further, in some embodiments, the frequency kernel matrix $\Omega_b$ may be obtained by performing a summation operation on a discrete frequency kernel matrix variable $\Omega_b(i)$ with respect to a frequency range of a stopband of the TEQ 121. For example, for $N_{sb}$ tones in the stopband, the discrete frequency kernel matrix variable $\Omega_b(i)$ is:

$$\begin{bmatrix} 1 & \cos\left(\frac{2\pi k}{N}\right) & \cos\left(\frac{4\pi k}{N}\right) & \ldots & \cos\left[\frac{2(N_b-1)\pi k}{N}\right] \\ \cos\left(\frac{2\pi k}{N}\right) & 1 & \cos\left(\frac{2\pi k}{N}\right) & \ldots & \cos\left[\frac{2(N_b-2)\pi k}{N}\right] \\ \cos\left(\frac{4\pi k}{N}\right) & \cos\left(\frac{2\pi k}{N}\right) & 1 & \ldots & \cos\left[\frac{2(N_b-3)\pi k}{N}\right] \\ \vdots & \vdots & \vdots & \ddots & \vdots \\ \cos\left[\frac{2(N_b-1)\pi k}{N}\right] & \cos\left[\frac{2(N_b-2)\pi k}{N}\right] & \cos\left[\frac{2(N_b-3)\pi k}{N}\right] & \ldots & 1 \end{bmatrix},$$

where N is the DMT signal length, $N_b$=CP+1, and CP is a cyclic prefix length. The frequency kernel matrix $\Omega_b$ is then obtained from Equation (7):

$$\Omega_b = \sum_{i=0}^{N_{sb}-1} \Omega_b(i). \quad (8)$$

It should be noted that, the frequency kernel matrix $\Omega_w$ and the frequency kernel matrix $\Omega_b$ may be obtained from a discrete or continuous matrix variable, but is not limited thereto. That is, the frequency kernel matrix $\Omega_w$ may be alternatively obtained from a discrete frequency kernel matrix variable $\Omega_w(i)$, and/or the frequency kernel matrix $\Omega_b$ may be alternatively obtained from a continuous matrix variable $\Omega_b(\omega)$.

To obtain an optimum TEQ coefficient vector $w_{opt}$, let the partial derivative of the cost function $E_{all}$ of the DMT transmission system 100 with respect to the TEQ coefficient vector w equals 0, and the optimum TEQ coefficient vector $w_{opt}$ can be obtained from Equation (9):

$$w_{opt} = (R_{yy} + k\Omega_w)^{-1} R_{yx} b, \quad (9)$$

where $R_{yy}$ is an autocorrelation matrix of a sample vector y of the equalized DMT signal y(i), k is a weighting factor of the frequency kernel matrix $\Omega_w$, and $R_{yx}$ is a cross-correlation matrix between the sample vector y and a sample vector x of the transmitted DMT signal x(i).

On the other hand, to obtain an optimum TIR coefficient vector $b_{opt}$, let the partial derivative of the cost function $E_{all}$ of the DMT transmission system 100 with respect to the TIR coefficient vector b equals 0, and the optimum TIR coefficient vector $b_{opt}$ can be obtained from Equation (10):

$$b_{opt} = (R_{xx} + k\Omega_b)^{-1} R_{xy} w, \quad (10)$$

where $R_{xx}$ is an autocorrelation matrix of the sample vector x of the transmitted DMT signal x(i), k is a weighting factor of the frequency kernel matrix $\Omega_b$, and $R_{xy}$ is a cross-correlation matrix between the sample vector x and the sample vector y.

Figure 5:
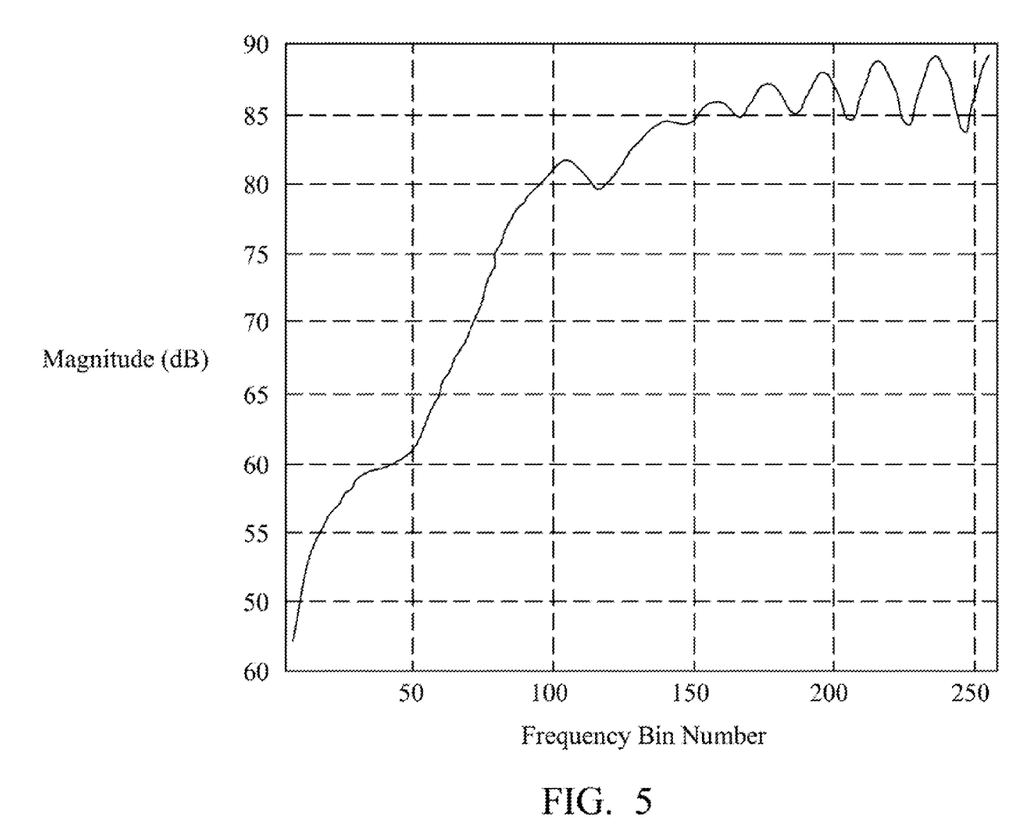
FIG. 5 shows a frequency-domain response of the TEQ in FIG. 1 with the TEQ coefficients calculated by iteratively updating an optimum TEQ coefficient vector obtained from a modified cost function in accordance with some embodiments of the present invention.

FIG. 5 shows a frequency-domain response of the TEQ 121 with the TEQ coefficients and the TIR coefficients calculated by iteratively updating the optimum TEQ coefficient vector $w_{opt}$ and the optimum TIR coefficient vector $b_{opt}$ obtained from Equations (9) and (10), respectively, where in particular, the ADSL transmission technology is adopted. As shown in FIG. 5, for downstream signals with the subcarriers in the upstream band (null frequency band) masked by zeros, the optimized TEQ coefficients and the optimized TIR coefficients effectively suppress the null frequency band. In comparison with FIG. 4, the null frequency band is effectively controlled, thereby improving the DMT transmission quality.

Therefore, by iteratively updating the TEQ coefficient vector and the TIR coefficient vector obtained from the modified cost function for the DMT transmission system with both time-domain equalization and frequency-domain equalization, the DMT transmission quality can be improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims.

What is claimed is:

1. A method for discrete multitone (DMT) transmission, the method comprising:
   receiving a DMT signal from a transmission channel;
   passing the DMT signal through a time-domain equalizer (TEQ) to obtain an equalized DMT signal;
   passing the DMT signal through a target impulse response (TIR) filter to obtain a TIR signal;
   obtaining a mean square error (MSE) of an error signal from the equalized DMT signal and the TIR signal; and
   iteratively updating a TEQ coefficient vector of the TEQ based on the MSE of the error signal, a frequency kernel matrix corresponding to the TEQ and a frequency kernel matrix corresponding to the TIR filter;
   wherein the frequency kernel matrix $\Omega_w$ corresponding to the TEQ is determined as $$\Omega_w = w_l \Omega_{wl} + w_h \Omega_{wh},$$

where $\Omega_{wl}$ is a low-frequency kernel matrix corresponding to the TEQ, $\Omega_{wh}$ is a high-frequency kernel matrix corresponding to the TEQ, and $w_l$ and $w_h$ are weighting factors of the low-frequency kernel matrix $\Omega_{wl}$ and the high-frequency kernel matrix $\Omega_{wh}$, respectively.

2. The method of claim 1, wherein the frequency kernel matrix $\Omega_b$ corresponding to the TIR filter is determined as:

$$\Omega_b = w'_l \Omega_{bl} + w'_h \Omega_{bh},$$

where $\Omega_{bl}$ is a low-frequency kernel matrix corresponding to the TIR filter, $\Omega_{bh}$ is a high-frequency kernel matrix corresponding to the TIR filter, and $w'_l$ and $w'_h$ are weighting factors of the low-frequency kernel matrix $\Omega_{bl}$ and the low-frequency kernel matrix $\Omega_{bh}$, respectively.

3. The method of claim 1, wherein the TEQ coefficient vector w is iteratively updated by the following equation:

$$w = (R_{yy} + k\Omega_w)^{-1} R_{yx} b,$$

where $R_{yy}$ is an autocorrelation matrix of a sample vector y of the equalized DMT signal, k is a weighting factor of the frequency kernel matrix $\Omega_w$, $R_{yx}$ is a cross-correlation matrix between the sample vector y and a sample vector x of the DMT signal, and b is a TIR coefficient vector of the TIR filter.

4. The method of claim 1, further comprising:
   iteratively updating a TIR coefficient vector of the TIR filter based on the MSE of the error signal, the frequency kernel matrix corresponding to the TEQ and the frequency kernel matrix corresponding to the TIR filter.

5. The method of claim 4, wherein the TIR coefficient vector b is iteratively updated by the following equation:

$$b = (R_{xx} + k\Omega_b)^{-1} R_{xy} w,$$

where $R_{xx}$ is an autocorrelation matrix of a sample vector x of the DMT signal, $\Omega_b$ is the frequency kernel matrix corresponding to the TIR filter, k is a weighting factor of the frequency kernel matrix $\Omega_b$, $R_{xy}$ is a cross-correlation matrix between the sample vector x and a sample vector y of the equalized DMT signal, and w is the TEQ coefficient vector.

6. The method of claim 1, wherein the frequency kernel matrix $\Omega_w$ is obtained by performing an integration operation on a continuous frequency kernel matrix variable with respect to a frequency range of a stopband of the TEQ.

7. The method of claim 6, wherein the continuous frequency kernel matrix variable is:

$$\begin{bmatrix} 1 & \cos(\omega) & \cos(2\omega) & \ldots & \cos[(N_w-1)\omega] \\ \cos(\omega) & 1 & \cos(\omega) & \ldots & \cos[(N_w-2)\omega] \\ \cos(2\omega) & \cos(\omega) & 1 & \ldots & \cos[(N_w-3)\omega] \\ \vdots & \vdots & \vdots & \ddots & \vdots \\ \cos[(N_w-1)\omega] & \cos[(N_w-2)\omega] & \cos[(N_w-3)\omega] & \ldots & 1 \end{bmatrix},$$

where $N_w$ is a TEQ length of the TEQ, and $\omega$ is the normalized frequency of the stopband from $\pi/2$ to $\pi$.

8. The method of claim 1, wherein the frequency kernel matrix corresponding to the TIR filter is a summation operation, on a discrete frequency kernel matrix variable with respect to a plurality of tones in a stopband of the TEQ.

9. The method of claim 8, wherein the discrete frequency kernel matrix variable is:

$$\begin{bmatrix} 1 & \cos\left(\frac{2\pi k}{N}\right) & \cos\left(\frac{4\pi k}{N}\right) & \ldots & \cos\left[\frac{2(N_b-1)\pi k}{N}\right] \\ \cos\left(\frac{2\pi k}{N}\right) & 1 & \cos\left(\frac{2\pi k}{N}\right) & \ldots & \cos\left[\frac{2(N_b-2)\pi k}{N}\right] \\ \cos\left(\frac{4\pi k}{N}\right) & \cos\left(\frac{2\pi k}{N}\right) & 1 & \ldots & \cos\left[\frac{2(N_b-3)\pi k}{N}\right] \\ \vdots & \vdots & \vdots & \ddots & \vdots \\ \cos\left[\frac{2(N_b-1)\pi k}{N}\right] & \cos\left[\frac{2(N_b-2)\pi k}{N}\right] & \cos\left[\frac{2(N_b-3)\pi k}{N}\right] & \ldots & 1 \end{bmatrix},$$

where N is a DMT signal length, $N_b = CP+1$, and CP is a cyclic prefix length.

10. An apparatus for discrete multitone (DMT) transmission, the apparatus comprising:

a time-domain equalizer (TEQ) configured to pass a DMT signal therethrough to obtain an equalized DMT signal;
a target impulse response (TIR) filter configured to pass the DMT signal therethrough to obtain a TIR signal;
an adder configured to generate an error signal from the equalized DMT signal and the TIR signal; and
a processor configured to perform operations comprising:
  obtaining a mean square error (MSE) of an error signal from the equalized DMT signal and the TIR signal;
  determining a frequency kernel matrix $\Omega_w$ corresponding to the TEQ from the following equation:

$$\Omega_w = w_l \Omega_{wl} + w_h \Omega_{wh},$$

where $\Omega_{wl}$ is a low-frequency kernel matrix corresponding to the TEQ, $\Omega_{wh}$ is a high-frequency kernel matrix corresponding to the TEQ, and $w_l$ and $w_h$ are weighting factors of the low-frequency kernel matrix $\Omega_{wl}$ and the high-frequency kernel matrix $\Omega_{wh}$, respectively; and
  iteratively updating a TEQ coefficient vector of the TEQ based on the MSE of the error signal, the frequency kernel matrix corresponding to the TEQ and a frequency kernel matrix corresponding to the TIR filter.

11. The apparatus of claim 10, wherein the processor is configured to perform operations comprising:
  determining the frequency kernel matrix $\Omega_b$ corresponding to the TIR filter from the following equation:

$$\Omega_b = w'_l \Omega_{bl} + w'_h \Omega_{bh},$$

where $\Omega_{bl}$ is a low-frequency kernel matrix corresponding to the TIR filter, $\Omega_{bh}$ is a high-frequency kernel matrix corresponding to the TIR filter, and $w'_l$ and $w'_h$ are weighting factors of the low-frequency kernel matrix $\Omega_{bl}$ and the low-frequency kernel matrix $\Omega_{bh}$, respectively.

12. The apparatus of claim 10, wherein the processor is configured to perform operations comprising:
  iteratively updating the TEQ coefficient vector w by the following equation:

$$w = (R_{yy} + k\Omega_w)^{-1} R_{yx} b,$$

where $R_{yy}$ is an autocorrelation matrix of a sample vector y of the equalized DMT signal, k is a weighting factor of the frequency kernel matrix $\Omega_w$, $R_{yx}$ is a cross-correlation matrix between the sample vector y and a sample vector x of the DMT signal, and b is a TIR coefficient vector of the TIR filter.

13. The apparatus of claim 10, wherein the processor is configured to perform operations comprising:
  iteratively updating a TIR coefficient vector of the TIR filter based on the MSE of the error signal, the frequency kernel matrix corresponding to the TEQ and the frequency kernel matrix corresponding to the TIR filter.

14. The apparatus of claim 13, herein the processor is configured to perform operations comprising:
  iteratively updating the TIR coefficient vector b by the following equation:

$$b = (R_{xx} + k\Omega_b)^{-1} R_{xy} w,$$

where $R_{xx}$ is an autocorrelation matrix of a sample vector x of the DMT signal, $\Omega_b$ is the frequency kernel matrix corresponding to the TIR filter, k is a weighting factor of the frequency kernel matrix $\Omega_b$, $R_{xy}$ is a cross-correlation matrix between the sample vector x and a sample vector y of the equalized DMT signal, and w is the TEQ coefficient vector.

15. The apparatus of claim 10, herein the processor is configured to perform operations comprising:
  determining the frequency kernel matrix $\Omega_w$ by performing an integration operation on a continuous frequency kernel matrix variable with respect to a frequency range of a stopband of the TEQ.

16. The apparatus of claim 15, wherein the continuous frequency kernel matrix variable is:

$$\begin{bmatrix} 1 & \cos(\omega) & \cos(2\omega) & \ldots & \cos[(N_w-1)\omega] \\ \cos(\omega) & 1 & \cos(\omega) & \ldots & \cos[(N_w-2)\omega] \\ \cos(2\omega) & \cos(\omega) & 1 & \ldots & \cos[(N_w-3)\omega] \\ \vdots & \vdots & \vdots & \ddots & \vdots \\ \cos[(N_w-1)\omega] & \cos[(N_w-2)\omega] & \cos[(N_w-3)\omega] & \ldots & 1 \end{bmatrix},$$

where $N_w$ is a TEQ length of the TEQ, and $\omega$ is the normalized frequency of the stopband from $\pi/2$ to $\pi$.

17. The apparatus of claim 10, wherein the processor is configured to perform operations comprising:
  determining the frequency kernel matrix corresponding to the TIR filter by performing a summation operation on a discrete frequency kernel matrix variable with respect to a plurality of tones in a stopband of the TEQ.

18. The apparatus of claim 17, wherein the discrete frequency kernel matrix variable is:

$$\begin{bmatrix} 1 & \cos\left(\frac{2\pi k}{N}\right) & \cos\left(\frac{4\pi k}{N}\right) & \ldots & \cos\left[\frac{2(N_b-1)\pi k}{N}\right] \\ \cos\left(\frac{2\pi k}{N}\right) & 1 & \cos\left(\frac{2\pi k}{N}\right) & \ldots & \cos\left[\frac{2(N_b-2)\pi k}{N}\right] \\ \cos\left(\frac{4\pi k}{N}\right) & \cos\left(\frac{2\pi k}{N}\right) & 1 & \ldots & \cos\left[\frac{2(N_b-3)\pi k}{N}\right] \\ \vdots & \vdots & \vdots & \ddots & \vdots \\ \cos\left[\frac{2(N_b-1)\pi k}{N}\right] & \cos\left[\frac{2(N_b-2)\pi k}{N}\right] & \cos\left[\frac{2(N_b-3)\pi k}{N}\right] & \ldots & 1 \end{bmatrix},$$

where N is a DMT signal length, $N_b$=CP+1, and CP is a cyclic prefix length.

* * * * *